United States Patent
Bühler

(12) United States Patent
(10) Patent No.: US 8,414,016 B2
(45) Date of Patent: Apr. 9, 2013

(54) INTERNAL PANELING PART

(75) Inventor: Wolfram Bühler, Karlsruhe (DE)

(73) Assignee: Faurecia Innenraum Systeme GmbH, Hagenbach (DE)

(*) Notice: Subject to any disclaimer, the term of this patent is extended or adjusted under 35 U.S.C. 154(b) by 0 days.

(21) Appl. No.: 12/919,196

(22) PCT Filed: Feb. 24, 2009

(86) PCT No.: PCT/EP2009/001578
§ 371 (c)(1),
(2), (4) Date: Nov. 19, 2010

(87) PCT Pub. No.: WO2009/106363
PCT Pub. Date: Sep. 3, 2009

(65) Prior Publication Data
US 2011/0062686 A1    Mar. 17, 2011

(30) Foreign Application Priority Data
Feb. 25, 2008  (DE) .................. 10 2008 011 519

(51) Int. Cl.
B60R 21/205      (2006.01)
B60R 21/2165     (2006.01)

(52) U.S. Cl.
USPC ........................................ 280/728.3; 280/732

(58) Field of Classification Search .................. 280/732, 280/728.3
See application file for complete search history.

(56) References Cited

U.S. PATENT DOCUMENTS

| | | | |
|---|---|---|---|
| 5,096,220 A | 3/1992 | Nakajima | |
| 5,221,108 A | 6/1993 | Hirabayashi | |
| 5,779,262 A * | 7/1998 | Totani et al. | 280/728.3 |
| 7,100,941 B2 * | 9/2006 | Riha et al. | 280/728.3 |
| 7,770,916 B2 * | 8/2010 | Okumura et al. | 280/728.3 |
| 2005/0062271 A1 * | 3/2005 | Heckl et al. | 280/732 |
| 2007/0018435 A1 * | 1/2007 | Muller et al. | 280/728.3 |
| 2007/0052210 A1 * | 3/2007 | Schweizer et al. | 280/728.3 |
| 2010/0308566 A1 * | 12/2010 | Roring et al. | 280/728.3 |

FOREIGN PATENT DOCUMENTS

| | | |
|---|---|---|
| DE | 19651758 A1 | 6/1997 |
| DE | 19718931 C1 | 8/1998 |
| DE | 69507003 T2 | 7/1999 |
| DE | 19935625 A1 | 2/2001 |
| DE | 10055546 A1 | 9/2001 |
| DE | 10246338 A1 | 5/2003 |
| DE | 102005016262 A1 | 10/2006 |
| EP | 0033934 A1 | 8/1981 |
| EP | 0943709 A1 | 9/1999 |
| EP | 1359063 A1 | 11/2003 |
| JP | 5162603 A | 6/1993 |

OTHER PUBLICATIONS

International Search Report and Written Opinion issued in PCT/EP2009/001578, mailed May 29, 2009, 10 pages (English translations).

* cited by examiner

Primary Examiner — Ruth Ilan
(74) Attorney, Agent, or Firm — Faegre Baker Daniels LLP

(57) ABSTRACT

An internal paneling part conceals a passage area of an airbag. The internal paneling part includes a planar carrier and a textile fabric covering at least part of the passage area. The textile fabric includes at least one initial weakening for tearing along a defined tear line to release the airbag. The defined tear line runs along an X direction, with the textile fabric having a further tearing force in the X direction that is less than in any other direction.

19 Claims, 3 Drawing Sheets

US 8,414,016 B2

INTERNAL PANELING PART

CROSS-REFERENCE TO RELATED APPLICATIONS

The present application is a National Phase application of PCT/EP2009/001578, filed pursuant to 35 U.S.C. §371, which claims priority to DE 10 2008 011 519.3, filed Feb. 25, 2008. Both application are incorporated herein by reference in their entirety.

TECHNICAL FIELD

The invention relates to an inner paneling part for covering an airbag.

BACKGROUND

Known inner paneling parts according to the state of the art are associated with disadvantages resulting from variation in airbag release momentum. In two- or multistage airbag systems, in the case of minor accidents, only one stage or even no stage is triggering, and a time delay in triggering a further stage is dependent upon the scenario. Very great differences between different possible opening impacts can be caused, by possibly considerable temperature dependent properties of, for example, a pyrotechnic filling device.

The inner paneling part, in the region of the passage opening, is typically designed to be sufficiently weak in order to ensure reliable breaking open by the opening airbag even in the case of an opening impact with as little momentum as possible. In accordance with the state of the art, this has the result that, when an airbag is deployed, only a very limited energy quantity which is extensively independent of the scenario can be absorbed by breaking open the inner paneling part. In the case of scenarios when an airbag opens with greater momentum, consequently a substantially smaller quantity of energy is absorbed by tearing open and folding back the covering than would be desirable with respect to the momentum of the opening impact.

As a result, material destruction caused by excess energy on the inner paneling part and adjacent components (in particular also on a vehicle windscreen which can consequently be broken) and a flight of particles which is associated therewith and endangers the vehicle passengers can scarcely be avoided or only with great complexity, such as for example, by complex reinforcement of the inner paneling part in regions which surround the passage opening. A rebound strap has been used to reduce in particular breakage of the windscreen by which a rapidly emerging airbag cover is stopped before impinging on the windscreen. However, it has been shown that these straps which are "slack" up to the extreme position during the explosion process allow unimpeded maximum acceleration of the airbag cover which in general is uncontrollable.

Basically it can be said that the opening behavior of an airbag flap/an airbag cover, according to the state of the art, must be directed or influenced by the type and intensity of the weakness of the flap or of the cover. The necessary level of force for opening the cover is limited by the characteristic values of the material of the weakened material which is used.

SUMMARY

In some embodiments, an inner paneling part and a corresponding airbag arrangement combines a simple construction which is economical to produce with properties which, when an airbag is triggered, safely prevent uncontrolled bursting and also destruction of the material associated with the formation of fragments, the flight of particles and production of sharp edges and in fact for as far as possible a further range of possible energy inputs by the opening airbag in the inner paneling part. In some embodiments, with airbag arrangements that are situated extremely close to a windscreen, no breakage of the windscreen results even with multistage triggering.

In some embodiments, an inner paneling part for covering the passage region of an airbag includes a planar carrier, a textile fabric that covers at least a part of the passage region, and at least one initial weakening in the textile fabric for tearing open the textile fabric along a defined tear line for releasing the airbag, at least one direction of the defined tear line extending along a preferred X direction of the textile fabric. A further tearing force of the textile fabric in the preferred direction is less than in any other directions of the textile fabric.

In some embodiments, this arrangement avoids destruction of the windshield during unfolding of an airbag. This is important in particular with airbag arrangements that are integrated in an instrument panel and when the airbag arrangement is situated close to the windshield.

In some embodiments, controlled tearing is achieved with a predetermined relevant force/level of force, the acceleration of the rapidly emerging airbag flap/airbag cover is controlled over the entire duration of the triggering/tearing-open process.

In some embodiments, there are advantages including a defined adjustment of the tearing parameters of the inner paneling part when the airbag is triggered, in particular adjustment of a predetermined force with a predetermined elongation. In addition, precise absorbing of the respective impact force is achieved, irrespective of the intensity in the case of multistage airbag triggerings.

In total, it can therefore be said that, with the present application, controlled opening of the airbag is ensured during the entire accident phase, in particular also defined tear lines are guaranteed here which are produced by the preferred direction of the weakened textile fabric.

The inner paneling part is possible in particular for arrangement in automotive vehicles or as part of an instrument panel. However, it is also possible to fit the latter in side airbags at any positions of automotive vehicles.

The phrase "planar carrier" is intended to refer to a dimensionally stable element which includes supporting functions (e.g. supporting a decorative part or also holding an airbag device). Such a carrier can be for example made of a polypropylene provided with a long glass fiber supplement or any other plastic material. In some embodiments, the carrier may be metal or wood.

In some embodiments, the "textile fabric" covers the passage region at least in regions. Complete covering can be herewith intended or also only a small covering. Furthermore, the covering can be effected over a "hole" in the carrier or over a "closed" carrier which hence has an integral airbag cover.

The textile fabric has an "initial weakening" for tearing the textile fabric along a defined tear line in order to release the airbag. In some embodiments, the "initial weakening" is an incision, laser weakening, perforation etc., but is not intended to be restricted hereto.

The "tear line" extends along a preferred direction of the textile fabric. As used herein, "preferred direction" refers to a direction in which the tearing is intended to be effected in a defined manner. The further tearing force of the textile fabric in the preferred direction is hereby lower than in all other directions of the textile fabric. It is achieved herewith that the further tearing is effected also in the defined direction and that no "yielding" to the sides is provided here, which could lead to "blowing up" of the instrument panel and to uncontrolled further destruction. The textile fabric is hereby respectively attached to the inner paneling part or an airbag cover or a decorative part such that not only is a defined opening of the passage region achieved herewith but also, due to the attachment to other components, these other components are likewise prevented from flying off.

In some embodiments, the further tearing force, determined in the leg further tearing test according to EN ISO 13937-2, is between 40 N and 1,000 N. In some embodiments, the further tearing force is between 50 N and 500 N. In some embodiments, the further tearing force is between 60 N and 200 N. The size of the sample is hereby 150 mm×50 mm, the clamping length is 100 mm, the initial force is 2 N and the test speed is 100 mm/min. In embodiments in which the planar carrier has an opening in the passage region, there is a tendency hereby to assume the further tearing force to be smaller from the outset (for example between 40 N and 150 N), while the forces should be calculated as higher in the case of "continuous" carriers. In general, the edge of the passage region is however weakened by additional weakening (for example by laser perforations), the position of the perforation in the planar carrier is correspondingly mutually coordinated with the tear line of the textile fabric which is connected thereto.

In some embodiments t the further tearing force in the preferred direction is at least 1.5 to 10 times less than the tearing force in other directions of the textile fabric (above all in the direction orthogonal hereto in the surface plane). In some embodiments, the further tearing force in the preferred direction is 3 to 7 times less than that in other directions. In this way, it is ensured that tearing is always effected in the direction of the preferred direction even with very strong explosions.

In some embodiments the tensile strength in the preferred direction is greater than in other directions in the surface plane of the textile fabric. The determination is effected according to EN ISO 13934-1 with an example sample of the dimension 70 mm×15 mm. The maximum tensile strength of the textile fabric in the preferred direction can hereby be between 200 and 4,000 N. For a first example material, the maximum tensile strength in the x-direction is 900-1,100 MPa and in the y-direction 600 MPa, for a second example material in the x-direction, 1,500-1,700 MPa and in the y-direction 250-350 MPa and, for a third material, 2,000-2,200 MPa in the x-direction and 500 MPa in the y-direction. The corresponding breaking elongation of the textile fabric in the preferred direction is hereby between 50% and 80%. It is ensured with this adjustment that a defined force is always available with a desired elasticity/elongation, consequently a controlled opening process results. For the first example material, the corresponding breaking elongation for the above-mentioned maximum tensile strengths is 50-60% in the x-direction and 120-150% in the y-direction; for the second material 70% in x-direction and 100-130% in y-direction and, for the third example material, 60% in x-direction and 100-130% in y-direction.

In some embodiments, the textile fabric is a woven fabric, a knitted fabric or a fleece. In some embodiments in which the textile fabric is a woven fabric, the preferred direction may extend in the direction of the warp threads or the weft threads.

In some embodiments, the textile fabric may be plastic materials, polyester woven fabrics or knitted fabrics. These materials may have a basis weight of 250-600 g/m$^2$ (single layer textile) or 350-800 g/m$^2$ (textile with barrier foil). In some embodiments, if the passage region is covered with the textile fabric, the barrier foil may be provided to overlap beyond the edge by about 5-15 mm. The textile fabric can be single-layer or multilayer. In some embodiments, the textile fabric may include "sealing foils" as part of the textile fabric. The textile fabric can therefore also include a plurality of "homogeneous" layers as long as a preferred direction is provided overall.

In some embodiments, the airbag is a passenger airbag of an instrument panel of an automotive vehicle. It is hereby possible that the smallest spacing between a hinge of the cover of the passage region and a windshield is between 30 and 150 mm. In some embodiments, the smallest spacing is between 40 and 100 mm.

The textile fabric can be attached separately to the planar carrier, in particular by riveting or screwing. However, it is also possible that the latter is for example securely welded to the planar carrier or is glued to the latter.

In some embodiments, the tear line of the textile fabric may be parallel to an edge of the passage region at least in regions. In some embodiments, the textile fabric completely overlaps the passage region.

In some embodiments, such as when the airbag is a passenger airbag of an instrument panel, the initial weakening of the textile fabric may be situated on a side of the passage region orientated away from a windshield of an automotive vehicle. As mentioned above, the initial weakening may be achieved in the form of an incision of the textile fabric or another weakening. The length of the incision in the preferred direction can hereby be at least 2 to 20 mm. In some embodiments, the length of the incision in the preferred direction is 5 to 15 mm.

The arrangement of the textile fabric on the planar carrier can be designed differently. The textile fabric can be disposed on the side of the planar carrier orientated towards or away from an airbag module.

In some embodiments, the textile fabric can be welded or injected into the planar carrier at least in regions. In some embodiments, the planar carrier has a hinge for opening and holding an airbag cover, the hinge being a textile material or a metal. In some embodiments, the hinge is even part of the textile fabric, however in some embodiments the hinge represents an independent part.

In some embodiments, the textile fabric is disposed on a side of the planar carrier orientated away from an airbag module and the planar carrier has an opening in the passage region which is covered by the textile fabric and the textile fabric is disposed between a visible-side decorative layer which may be rear-foamed and the planar carrier.

BRIEF DESCRIPTION OF THE FIGURES

The invention is now explained with reference to several Figures.

DETAILED DESCRIPTION

Figure 1:
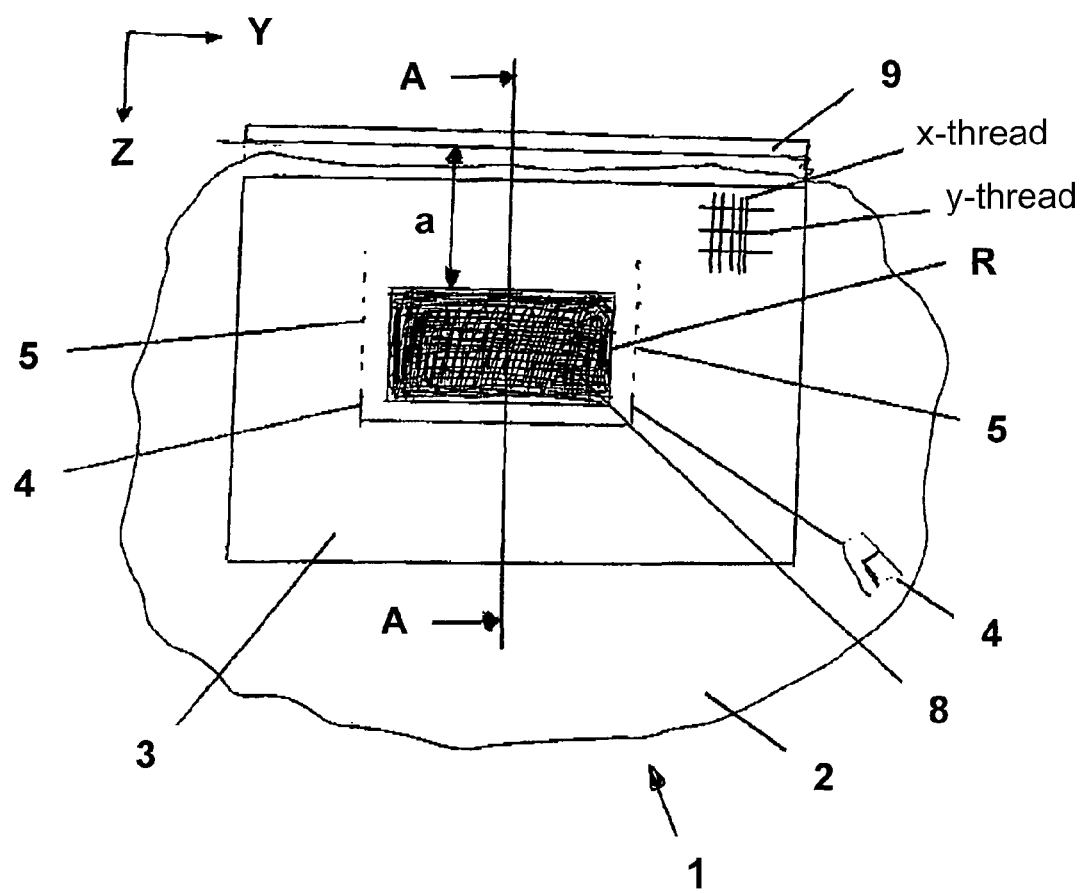
FIG. 1 is a schematic plan view of an inner paneling part according to an embodiment of the invention.

FIG. 1 shows an inner paneling part 1 according to an embodiment of the invention. This inner paneling part includes or covers a passage region 8. There is shown a planar carrier 2 that is made of polypropylene with a long glass fiber supplement (PP30LGF) onto which a textile fabric 3 is glued/welded and in addition is riveted at points. Hereby shown is a plan view (the passage region is illustrated over the whole surface in black, however is situated below the continuous textile fabric 3). The textile fabric 3 has an initial weakening 4. In some embodiments, this initial weakening is configured as an incision in the textile fabric, the incision to be torn further is hereby orientated in the x-direction. In total, a continuous "U"-shaped incision in the textile fabric is provided, the legs of the "U" representing an initial weakening. Connected to this initial weakening 4 is then a tear line 5. This tear line 5 can be a line weakened in places. In some embodiments, the tear line 5 is however an unweakened continuation of the initial weakening. The "x"-direction is the "preferred direction" of the textile fabric represented here. The tear line 5 extends along this preferred direction, the further tearing force of the textile fabric in the preferred direction, "x-direction", being less than in all other directions of the textile fabric. As a result, "further tearing" in the x-direction is reliably achieved. This "further tearing" occurs during passage of the airbag and the textile fabric is torn enough that the corresponding energy of the unfolding airbag is correspondingly absorbed.

Due to this controlled tearing force with controlled elongation, an uncontrolled "rapid emergence" of the portion covering the passage region of the textile fabric is avoided and consequently also damage to the windshield 9 is prevented.

In some embodiments, the further tearing force in the x-direction of the unweakened textile fabric, after determination in the leg further tearing test, according to EN ISO 13937-2, is 60 N. The further tearing force in the preferred direction is more than 1.5 times less than in all other directions of the textile fabric, in particular than in the y-direction orthogonal to the x-direction (preferred direction). In an embodiment, the greatest tensile strength of a particular textile fabric may be is 1,600 N in the x-direction (corresponding breaking elongation 70%) and 300 N in the y-direction (corresponding breaking elongation 115%), determined from a sample 70 mm×15 mm.

In every direction other than the x-direction in the surface plane (x-y plane), the textile fabric has less tensile strength.

In some embodiments, the present textile fabric is a woven fabric. The preferred direction (x-direction) hereby extends in the direction of the warp threads or of the weft threads of the woven fabric.

In some embodiments, the textile fabric 3 in the present case is multilayer, a sealing foil is applied on a textile woven layer, which belongs to the textile fabric and seals the latter relative to the planar carrier 2 impermeably to foam.

The present inner paneling part is part of an instrument panel in the region of a passenger airbag for automotive vehicles. The smallest spacing (a, see FIGS. 1 and 2) between a hinge of the passage region and a windshield is for example 70 mm.

Figure 2:
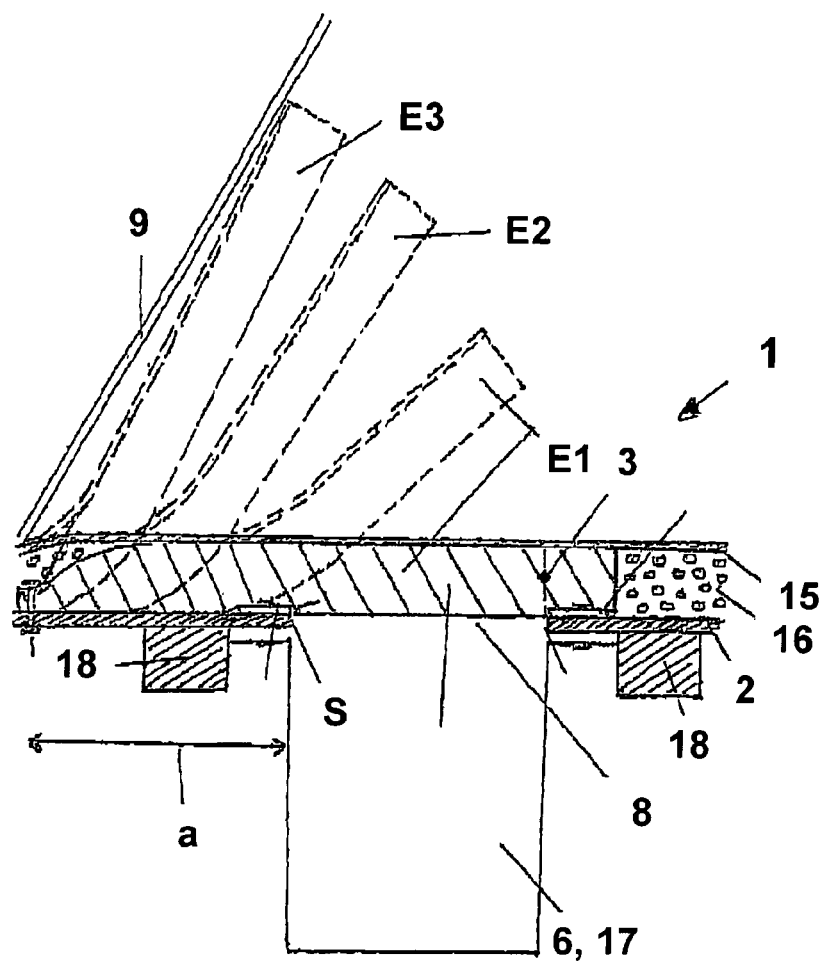
FIG. 2 is a cross section of the inner paneling part of FIG. 1.

FIG. 2 shows a section through the inner paneling part along line A-A of FIG. 1. The part of the instrument panel illustrated in FIG. 2 has the planar carrier 2, a surface decorative part 15 formed by a molded skin and an intermediate layer 16 which essentially consists of a polyurethane foam. In the Figure, also a windshield 9 of an automotive vehicle in which the instrument panel is incorporated can be detected. In some embodiments, in the planar carrier 2, the passage region 8 (indicated in FIG. 1 in black and flat) is recessed for a passenger airbag. An airbag module 17 is disposed behind the passage region 8 and may be screwed/riveted onto the carrier at an edge R of the passage region, for which purpose inserted metal sheets are placed on the planar carrier 2 there. In some embodiments, the planar carrier 2 is also reinforced by a plastic material frame 18 surrounding the passage region 8, which frame is melted from below onto the planar carrier 2. In some embodiments, the textile fabric 3 made of a polyamide woven fabric is inserted into the intermediate layer 16, which polyamide woven fabric is a component of the intermediate layer 16 and is covered or penetrated partially by the polyurethane foam. As a result of the fact that the textile fabric 3 covers the passage region 8, the instrument panel in this region (in which the planar carrier 2 is recessed) also achieves sufficient dimensional stability. Likewise shown in the Figure are three triggering states (E1, E2, E3) which result according to the strength of the airbag firing. In the case of the strongest firing (E3), the windshield is not hereby touched such that breakage of the windshield is prevented.

Figure 3A:
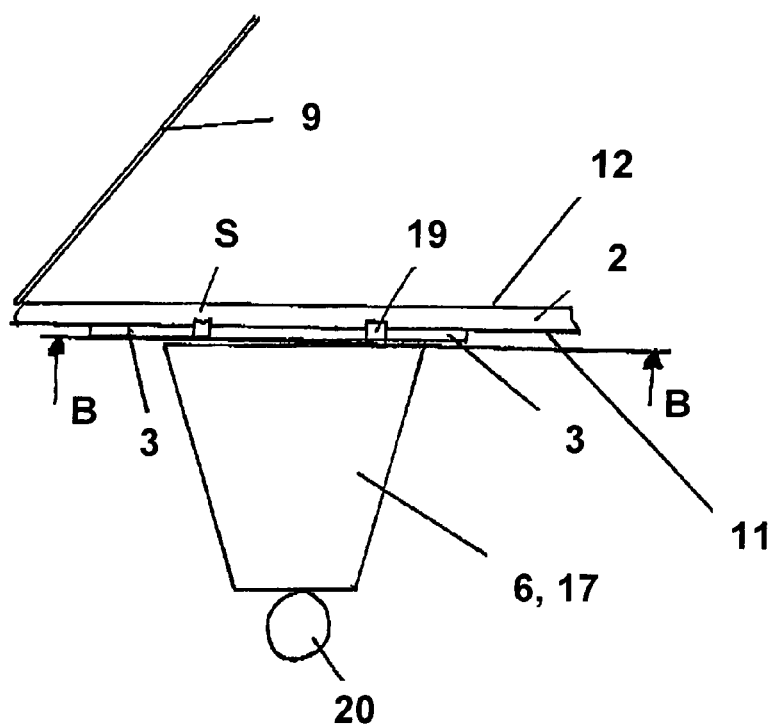
FIGS. 3a and 3b are views of an inner paneling part according to an embodiment of the invention.
Figure 3B:
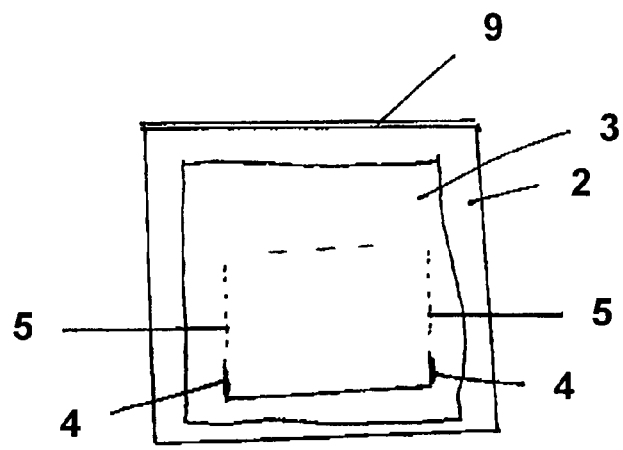

FIGS. 3a and 3b show an alternative embodiment. It is intended to be shown that the invention is not restricted solely to the embodiment according to FIG. 2. FIG. 3a shows in turn an instrument panel in section in the passenger region, with a windshield 9. In some embodiments, such as in the case of an economical automotive vehicle, the planar carrier 2 is not laminated with a decorative foil. The textile fabric 3 is welded on the underside of the planar carrier 2. A weakened region 19 which is continued not only in the textile fabric but also in the planar carrier 2 is produced. The airbag module 17 is supported on a vehicle transverse carrier (cross car beam) 20.

FIG. 3b shows a view B-B of FIG. 3a. The tear line 5, which abuts against an initial weakening 4, can be detected here again. In the region of this tear line 5, the textile fabric is unweakened. The position of the hinge S can also be seen here. The hinge is formed from the textile fabric which also has the further tearing properties as described above.

The invention claimed is:

1. An inner paneling part for covering a passage region of an airbag, the inner paneling part comprising:
    a planar carrier;
    a textile fabric that covers at least part of the passage region;
    at least one initial weakening in the textile fabric for tearing open the textile fabric along a defined tear line for releasing the airbag, at least one direction of the defined tear line extending along an X direction of the textile fabric;
    wherein a further tearing force of the textile fabric in the X direction is less than in all other directions of the textile fabric; and
    wherein a tensile strength of the textile fabric in the X direction is greater than in other directions in an XY surface plane of the textile fabric.

2. The inner paneling part of claim 1, wherein the further tearing force in the X direction is between about 40 and 1,000 Newtons.

3. The inner paneling part of claim 1, wherein the further tearing force in the X direction is at least about 1.5 to about 10 times less than in other directions of the textile fabric.

4. The inner paneling part of claim 1, wherein a maximum tensile strength of the textile fabric in the X direction is between about 200 and about 4,000 Newtons.

5. The inner paneling part of claim 4, wherein a corresponding breaking elongation of the textile fabric in the X direction is between 40% and 80%.

6. The inner paneling part of claim 1, wherein the textile fabric is a woven fabric, a fleece, a knitted fabric or a sealing foil.

7. The inner paneling part of claim 6, wherein the textile fabric is a woven fabric including warp threads and weft threads, and the X direction extends in the direction of the warp threads or the weft threads.

8. The inner paneling part of claim 1, wherein a minimum spacing between a hinge of the passage region and a vehicle windshield is between about 30 and about 150 millimeters.

9. The inner paneling part of claim 1, wherein the textile fabric is riveted or screwed to the planar carrier or is welded or injected into the planar carrier.

10. The inner paneling part of claim 1, wherein the defined tear line of the textile fabric is parallel to an edge of the passage region.

11. The inner paneling part of claim 1, wherein the textile fabric overlaps the passage region.

12. The inner paneling part of claim 1, wherein the initial weakening of the textile fabric is situated on a side of the passage region oriented away from a vehicle windshield.

13. The inner paneling part of claim 1, wherein the initial weakening comprises an incision in the textile fabric.

14. The inner paneling part of claim 13, wherein the incision has a length in the X direction of about 2 to about 20 millimeters.

15. The inner paneling part of claim 1, wherein the textile fabric is disposed on a side of the planar carrier oriented towards an airbag module.

16. The inner paneling part of claim 1, wherein the planar carrier includes a hinge for opening and holding an airbag cover.

17. The inner paneling part of claim 16, wherein the hinge is made of a textile material or a metal.

18. The inner paneling part of claim 17, wherein the hinge is part of the textile fabric.

19. The inner paneling part of claim 1, wherein the textile fabric is disposed on a side of the planar carrier orientated away from an airbag module; the planar carrier has an opening in the passage region that is covered by the textile fabric; and the textile fabric is disposed between a visible-side decorative layer and the planar carrier.

* * * * *